(12) United States Patent
Lee

(10) Patent No.: US 7,817,861 B2
(45) Date of Patent: Oct. 19, 2010

(54) DETECTION OF IMAGE SPAM

(75) Inventor: Martin Giles Lee, Oxford (GB)

(73) Assignee: Symantec Corporation, Mountain View, CA (US)

(*) Notice: Subject to any disclaimer, the term of this patent is extended or adjusted under 35 U.S.C. 154(b) by 951 days.

(21) Appl. No.: 11/636,713

(22) Filed: Dec. 11, 2006

(65) Prior Publication Data

US 2008/0127340 A1    May 29, 2008

(30) Foreign Application Priority Data

Nov. 3, 2006    (GB)    ................... 0621962.0

(51) Int. Cl.
*G06K 9/62* (2006.01)
*G06K 9/68* (2006.01)
*G06K 9/00* (2006.01)

(52) U.S. Cl. .................. 382/209; 382/219; 382/100

(58) Field of Classification Search .................. 382/100
See application file for complete search history.

(56) References Cited

U.S. PATENT DOCUMENTS

| 5,898,779 | A * | 4/1999 | Squilla et al. | ............... | 713/176 |
| 6,732,157 | B1 | 5/2004 | Gordon et al. | | |
| 7,016,549 | B1 | 3/2006 | Utagawa | ..................... | 382/261 |
| 2003/0219145 | A1* | 11/2003 | Smith | ......................... | 382/100 |
| 2004/0227836 | A1* | 11/2004 | Tanaka | .................. | 348/333.11 |
| 2005/0030589 | A1 | 2/2005 | El-Gazzar et al. | ........... | 358/402 |
| 2005/0091321 | A1 | 4/2005 | Daniell et al. | | |
| 2005/0216564 | A1 | 9/2005 | Myers et al. | | |
| 2006/0062474 | A1 | 3/2006 | Paschalakis et al. | .......... | 382/190 |
| 2006/0092292 | A1 | 5/2006 | Matsuoka et al. | ...... | 348/231.99 |
| 2006/0093221 | A1 | 5/2006 | Kasutani | ..................... | 382/191 |
| 2006/0123083 | A1 | 6/2006 | Goutte et al. | | |

(Continued)

FOREIGN PATENT DOCUMENTS

EP    10-222438    8/1998

(Continued)

OTHER PUBLICATIONS

Aradhye, H.B.; Myers, G.K.; Herson, J.A.; , "Image analysis for efficient categorization of image-based spam e-mail," Document Analysis and Recognition, 2005. Proceedings. Eighth International Conference on , vol., no., pp. 914-918 vol. 2, Aug. 29-Sep. 1, 2005 doi: 10.1109/ICDAR.2005.135.*

(Continued)

*Primary Examiner*—Charles Kim
*Assistant Examiner*—Nirav G Patel
(74) *Attorney, Agent, or Firm*—Gunnison, McKay & Hodgson, L.L.P.; Philip McKay

(57) ABSTRACT

A method of detecting spam images in electronic objects such as emails includes compressing images extracted from the electronic object into a common representation using a lossy compression function and determining if the compressed forms of the extracted images are identical to the compressed form of any known spam image from a corpus of known spam images, which compressed forms are the known spam images compressed into the common representation using the lossy compression function. The electronic objects are signalled as embedding a spam image on the basis of a compressed form of an extracted image extracted from an electronic object being determined to be identical to the compressed form of a known spam image.

29 Claims, 10 Drawing Sheets

U.S. PATENT DOCUMENTS

| | | | |
|---|---|---|---|
| 2006/0143176 A1 | 6/2006 | Mojsilovic et al. | 707/6 |
| 2006/0147186 A1 | 7/2006 | Kasutani et al. | 386/107 |
| 2009/0100523 A1* | 4/2009 | Harris | 726/26 |

FOREIGN PATENT DOCUMENTS

| | | |
|---|---|---|
| GB | 2 424 969 | 10/2006 |
| JP | 7-254065 | 3/1994 |
| JP | 2006-53774 | 2/2006 |
| WO | 01/53965 | 7/2001 |
| WO | 2004/008392 | 1/2004 |
| WO | 2004/053796 | 6/2004 |

OTHER PUBLICATIONS

Hrishikesh Aradhye et al.; "Image Analysis for Efficient Categorization of Image-based Spam E-mail"; IEEE Computer Society 2005.

International Search Report for PCT/GB2007/003739, Feb. 10, 2007.

* cited by examiner

| Set | Compressed Image |
|---|---|
| (1) | |
| (2) | |
| (3) | |
| (4) | |

4 Red Pixels

4 Green Pixels

Wednesday, April 26, 2006
iKarma Incorporated
(OTC: IKMA)

IKMA is ground floor
Could IKMA's iKarma become the MySpace of the business community? YOU never know...

Back in January of 2005 at MySpace was trading at $6.46 and later in the year it got bought out by News Corp for $580 million or more than $12 per share!

While MySpace is a social networking site that allows you to see how friends are connected to each other, iKarma allows you to see how businesses are connected to each other.

iKarma Inc. specializes in providing reputation and customer feedback systems for businesses and professionals. iKarma's mission is to help create prosperity and commerce by bringing greater trust and openness to business transactions. iKarma is a proud member of WOMMA, The Word of Mouth Marketing Association.

Go to Yahoo now and read the news that was released just today. Interviews with the CEO are available right now. Do your research and start WATCHING this one immediately.

Information within this report contains forward looking statements within the meaning of Section 27A of the Securities Act of 1933 and Section 21B of the SEC Act of 1934. Statements that involve discussions with respect to projections of future events are not statements of historical fact and may be forward looking statements. Don't rely on them to make a decision. The Company is not a reporting company registered under the Exchange Act of 1934. We have received four hundred thousand free trading shares from a third party not an officer, director or affiliate shareholder. We intend to sell all our shares now, which could cause the stock to go down, resulting in losses for you. It is an operating company. The company may need financing to continue as a good concern. A failure to finance could cause the company to go out of business. Read the Company's Annual Report and information Statement before you invest. This report shall not be construed as any kind of investment advice or solicitation. You can lose all your money by investing in this stock.

FIG. 8

Wednesday, April 26, 2006
iKarma Incorporated
(OTC: IKMA)

IKMA is ground floor
Could IKMA's iKarma become the MySpace of the business community? YOU never know...

Back in January of 2005 at MySpace was trading at $6.46 and later in the year it got bought out by News Corp for $580 million or more than $12 per share!

While MySpace is a social networking site that allows you to see how friends are connected to each other, iKarma allows you to see how businesses are connected to each other.

iKarma Inc. specializes in providing reputation and customer feedback systems for businesses and professionals. iKarma's mission is to help create prosperity and commerce by bringing greater trust and openness to business transactions. iKarma is a proud member of WOMMA, The Word of Mouth Marketing Association.

Go to Yahoo now and read the news that was released just today. Interviews with the CEO are available right now. Do your research and start WATCHING this one immediately.

Information within this report contains forward looking statements within the meaning of Section 27A of the Securities Act of 1933 and Section 21B of the SEC Act of 1934. Statements that involve discussions with respect to projections of future events are not statements of historical fact and may be forward looking statements. Don't rely on them to make a decision. The Company is not a reporting company registered under the Exchange Act of 1934. We have received four hundred thousand free trading shares from a third party not an officer, director or affiliate shareholder. We intend to sell all our shares now, which could cause the stock to go down, resulting in losses for you. It is an operating company. The company may need financing to continue as a good concern. A failure to finance could cause the company to go out of business. Read the Company's Annual Report and information Statement before you invest. This report shall not be construed as any kind of investment advice or solicitation. You can lose all your money by investing in this stock.

FIG. 9

SMALL-CAP INVESTORS APRIL LOCK OF THE MONTH !!!
SYMBOL: PGCN
Profits of 300-400% EXPECTED We think it goes to $2.00 on expected news.

Harbin Pingchuan Pharmaceutical:
Current Price: $.47
Shares outstanding: 20 Million
Market Capitalization: $6 Million
Short Term: 100-200% Growth
12 month Target: 300-600%
Market Performance: STRONG BUY

*WE URGE YOU TO PUT PGCN ON YOUR RADAR FOR FRIDAY MARCH 24, 2006*

HARBIN, China, /Xinhua-PRNewswire-FirstCall/ - Harbin Pingchuan Pharmaceutical Holding Co. Ltd. (OTC Bulletin Board: PGCN-News: "PINGCHUAN") announced today that PINGCHUAN signed a Purchase Agreement with the Guangdong Medicine Group Co. Ltd. ("GDMG").

Under the terms of the agreement, PINGCHUAN will authorize GDMG as its franchise in five southern provinces of China. With respect to the authorization, GDMG intends to purchase approximately US $2.00 million worth of PINGCUAN's pharmaceutical products in 2005. By cooperating with GDMG, PINGCHUAN will greatly enhance the marketing network and sales channels in Southern China.

"We are delighted to reach this agreement with the leading medical enterprise in Southern China. This purchase agreement not only increases out sales revenue in these five provinces, but also substantially improves out brand awareness in Southern China. While maintaining the existing marketing network, we are developing and setting up new marketing network and sales channel actively. "Said Hu ZhanWu, Chairman and President of Pingchuan Pharmaceutical Co. Ltd, "One of our marketing strategies is to establish a connection with medical enterprises such as Guangdong Medicine Group, for the promotion of our products into their commercial networks throughout the entire country."

REASON TO WATCH PGCN***
Make no mistake: Our mission at SmallCap-Investors is to claw our way through the thousands of under performing companies out there to find the golden needle in the haystack the micro-cap DIAMOND that can make you rich. More often than not, the stocks we profile show a significant increase in stock price and sometime in days, not months or years.

Do this often enough, and your portfolio can double, even TRIPLE in value. We Love this company and at anytime they can put out major news and the price can triple. BUY LOW TRADE HIGH! GOOD LUCK!

FIG. 10

FIG. 11

FIG. 12

```
       Visit our new online pharmacy
         store and save upto 95%
    ED MEDICINE CHEST BEST PRICE
    Generic Cialis            $3.00
    Generic Viagra            $1.56
    Generic Levitra           $7.78
    Generic Cialis SOFT New!  $3.33
    Generic Viagra SOFT       $1.89
       Special offer - order now!
```

FIG. 13

```
       Visit our new online pharmacy
         store and save upto 95%
    ED MEDICINE CHEST BEST PRICE
    Generic Cialis            $3.00
    Generic Viagra            $1.56
    Generic Levitra           $7.78
    Generic Cialis SOFT New!  $3.33
    Generic Viagra SOFT       $1.89
       Special offer - order now!
```

FIG. 14

DETECTION OF IMAGE SPAM

The present invention relates to the detection of image spam in electronic objects such as emails or more generally to the detection of reference images of any type.

Spam email causes increasing nuisance by flooding recipient's email inboxes with unwanted messages. Frequently the contents of the spam may contain fraudulent or explicit content and may cause distress or financial loss. The time spent dealing with these messages, the resources required to store and process them on an email system, and wasted network resources can be a significant waste of money.

Numerous techniques, have been developed to identify spam and distinguish it from otherwise legitimate emails. Often the techniques are based on a corpus of known spam emails and/or known ham emails (ie emails which are not spam) the text of which is compared to the text of a subject email under examination. One such widely used technique is that of Bayesian filtering. This technique involves parsing an email to identify the words or pairs of words within a message. A probabilistic calculation is then performed based on the frequency of occurrence of these words in previously received spam and non-spam messages. The filter then assigns a probability of the message being spam or not, upon which the recipient can base their decision whether to read the email or not.

Spammers have reacted in many ways to disguise their emails in an attempt to to avoid the detection of their messages as spam by such techniques. One particular method they have deployed is to depict their message contents as an image, embedded within a mail, rather than as the text in the message of the email. The image may represent text which is presented and conveys meaning to the recipient but as such text is not present as part of the message it is harder to analyse to detect spam. Of course a spam image which is identical to a known spam image in a corpus is easy to detect. However, the nature of an image means that it is straightforward for a spammer to alter a spam image so as to disguise its similarity to an image previously encountered in spam email without changing the subjective content and meaning to the recipient.

For example, in order to further frustrate analysis of spam images or any text contained within the images, spammers frequently alter them by various techniques, including:

changing image size;

changing width to height ratios including many single pixels of varying colours;

changing background or text colours; and changing the image format.

These and other techniques serve to render images containing identical content dissimilar. To the human viewer very little difference can be perceived between the images. But the differences are significant enough to frustrate attempts to recognise these images as closely related by computational means, and so detect an email as spam.

In one aspect, the present invention is concerned with detecting spam images in emails and other electronic objects based on a corpus of known spam images even in the case that such alterations have been made by a spammer.

Considering images more generally than spam images, there are many situations where it is desirable to detect images which are embedded in electronic objects, such as emails, as being reference images in a corpus and where similar issues arise when the image is altered. Therefore in a more general aspect the present invention is concerned with detecting images in emails and other electronic objects as being one of a corpus of known reference images but where there may have been some intentional or unintentional alteration of the image.

An additional issue in the case of analysing electronic objects such as emails is the speed and processing power needed to perform the analysis. The numbers of such electronic objects needing analysis are vast. For example MessageLabs Limited alone at the current time in October 2006 scans over a billion emails a week for spam and other problems such as malware. As the time and processing power available to the scanning is limited by practical considerations, the speed and processing required to perform the analysis is very important.

In other technical fields, there are many known image recognition techniques which aim to recognise a subject image, for example as follows.

Image indexing systems such as those described in US-2006/093,221; US-2006/092,292; WO-2004/008392; and JP-2006,053,774 extract features of an image, create an index of these and try and match these features within a database. This approach is unlikely to be applicable to the domain of spam where spammers actively attempt to obfuscate their images to mask any such features that may be indexed.

US-2006/143,176 enlarges on this idea by describing a queryable database for retrieving related images. However the index information used to retrieve these images is based on the semantic context of the images and the object in which they are found. In the context of spam analysis, any text associated with an image is likely to be gibberish designed to confuse language based spam filters. Processing of any image must be performed quickly to allow a high throughput of images, analysis of any textual semantic content within an image is likely to be computationally too expensive to meet the practical limitations of time and processing power available. Equally the textual content of such a spam image may be very limited and/or designed to frustrate such approaches.

US-2006/147,186 and US-2006/062,474 disclose systems which examine the histogram of colour information within an image to create an index with which to compare images. This approach is excellent for most image comparison. However in the domain of spam images, the colour histogram is typically deliberately altered so as to defeat this approach. Background colours can be changed. Text which appears black in one image may be composed of a dozen different near-black colours in another image.

Another type of image recognition technique is to detect pixel or pixel region matches, for example as described in patents WO-2004/053796, U.S. Pat. No. 7,016,549. Such a type of technique provides excellent accuracy but necessarily requires images to be compared one by one and as such is far too slow and computationally demanding for practical use in spam image detection.

According to one aspect of the present invention, there is provided a method of detecting spam images in electronic objects, the method comprising:

extracting images embedded in the electronic objects;

compressing the extracted images into a common representation;

determining if the compressed forms of the extracted images are identical to the compressed form, in said common representation, of any known spam image from a corpus of known spam images; and signalling electronic objects as embedding a spam image on the basis of a compressed form of an extracted image extracted from an electronic object being determined to be identical to the compressed form of a known spam image.

Similarly, there is provided a system which implements an equivalent method.

The present invention allows the detection of spam images based on a corpus of known spam images despite the obfuscation techniques of spammers described above. Images extracted from subject emails are compressed, and compared with a corpus of known spam images which have been also been compressed. A common representation is used for the compressed form of the images extracted from subject emails and the known spam images. As the compression function is lossy, the compression effectively removes information from the images before they are compared. This has can have the effect of removing alterations made by the spammer in an attempt to disguise the email in the case that the compressed forms of the original spam image and of the altered spam image are identical. This means that an extracted image can be detected as a spam image when its compressed form is identical to the compressed form of a known spam image in the corpus.

In practice it has been found that the nature of the alterations made by spammers allow many altered spam images encountered in practice to be detected in this manner. Hence the present invention is capable of providing a high detection rate. The detection rate can be increased by decreasing the size of the common representation but this also has the effect of increasing the false positive rate. In practice the size of the common representation may be chosen to provide any desired compromise between increasing the detection rate and decreasing the false positive rate.

Another important advantage of the present invention is to provide detection at a high speed and requiring a low amount of processing power, in particular as compared to many other types of image recognition technique. This is because both the compression of the extracted images and furthermore the determination of whether the compressed forms of the extracted image and the known images are identical are both inherently rapid and straightforward processes. Of course the corpus of known spam images may be compressed and the results stored as a preliminary process so that it is not necessary to compress the known spam images in the corpus repeatedly.

The determination of whether the compressed forms of the extracted image and the known images are identical may be speeded up further by the use of hash values. In particular, the hash value of the extracted image is calculated and compared with a stored set of hash values for the compressed forms of the known spam images, which may be calculated as a preliminary process. The comparison of hash values is very rapid indeed.

The present invention may be applied for detection of spam images in any type of electronic object. However it has particular application to electronic objects which are being passed through a node of a network. In this type of environment, large numbers of electronic object pass and need to be scanned-so the advantages of the present invention are strongly felt.

The present invention also has particular application to electronic objects where transmission is initiated by the sender, rather than by the recipient, one very common example being emails. In this scenario the recipient has little or no control over the content of the electronic object and so the problem of spam is at its greatest and the opportunity for a spammer is high.

Although the present invention has particular application to spam images, in general the technique for recognising similar images may be applied to any type of image and so according to a further aspect the present invention may be applied more generally in any situation where it is desired to detect images in electronic objects as being the same or altered versions of reference images in a corpus. By way of example and without limitation, an organisation may desire to detect images of sensitive documents leaving its control. In that case a corpus of reference images may be maintained and the invention applied to electronic objects sent outside the organisation. In such a security situation, the size of the common representation may be reduced to increase the detection rate, albeit at the cost of increasing the false positive rate.

To allow better understanding, an embodiment of the present invention will now be described by way of non-limitative example with reference to the accompanying drawings, in which:

FIGS. 8 to 14 are representations of different example spam images.

The following description is given with reference to spam images but applies equally to other types of image.

There will first be given description of the principles behind the use of image compression to recognise images in the present invention.

Figures 1, 2:
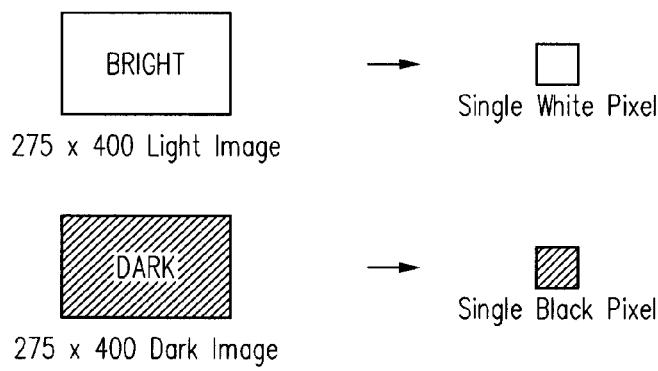
FIG. 1 is a drawing illustrating the compression of two images to a representation consisting of one pixel.
FIG. 2 is a drawing illustrating the compression of images to a representation consisting of two pixels.

Any image, if compressed, for example reduced in size and colour depth, to a large enough degree will compress to a representation consisting of one pixel and a palette of two colours, ie to a single white or black pixel. At this level of compression approximately half of all images resolve to a single white pixel, and half to a single black pixel. Therefore all images can be separated into two distinct sets; the set of images that compress to a black pixel, and the set of images that compress to a white pixel. For example FIG. 1 shows two different images and their compressed form when compressed to a single pixel. The upper image compresses to a white pixel and the lower image to a black pixel. Applying the same image compression function to any subsequent image of any size and any colour depth, will result in a compressed representation of the original image which can rapidly be assigned to one of the two sets.

Similarly, if the compression is to a representation consisting of two pixels, then four possible outcomes are available as shown in FIG. 2. That is a first set A of images compresses to a two white pixels; a second set B to two black pixels; a third set C to a white first pixel and a black second pixel; and a fourth set D to a black first pixel and a white second pixel. On compression of an image, these outcomes in the compressed representation identify one of four possible sets to which the image can be assigned As the image compression function is modified to result in a compressed image representation of increasing size and colour depth, so do the number of possible outcomes for any image subjected to the compression. As such, the number of sets to which an image can be assigned according to the results of applying the compression to the image also increases.

Figure 3:
FIG. 3 is a drawing illustrating the compression of two images to a representation consisting of four pixels.
Figure 3:
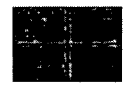
Figure 3:
Figure 3:

In general a suitable image compression function that outputs a compressed image of a common representation, for example a predetermined number of pixels and colour depth, can be used for image classification purposes. For example, an image compression function that takes an image of any size and colour depth and compressed it to a representation consisting of four pixels with a colour palette of five colours (red, green, blue, white and black), can be used to distinguish between images of green fields and images of poppy fields as shown in FIG. 3 which shows the images in their original and compressed forms.

In the present invention, a representation for the compressed images is chosen which allows recognition of altered versions of known spam images in a corpus.

In practice it has been found that a wide range of sizes of the common representation are effective to render all the visually related images sent by a spammer to a compressed form common to all the spam images. This compressed image is such that very few non-spam images when subjected to the same function compress to the same compressed form. By use of a corpus of known spam images, this fact can be used to categorize the altered images as similar to a known spam image and hence to be themselves spam.

The size of the common representation of the compressed images may be chosen to provide a desired compromise between the detection rate and the false positive rate which change with the size.

A strong compression function producing a small common representation provides few possible outcomes with a corresponding small number of possible sets of images. If too small, the classification of images may not be meaningful, in the sense that entirely unrelated images are determined to be similar. For example, the image compression illustrated in FIG. 3 may be used to identify images of poppy fields from images of green fields. That is to say by examining the result of the image compression filter when applied to an original image, the original image may be assigned to the set of images that resemble poppy fields, or the set of images that resemble green fields. However, at this level of compression the technique is prone to false positives, for example, an image of a red fire engine is indistinguishable from that of a poppy field, an image of a green frog, indistinguishable from an image of a green field. By increasing the size and number of colours in the compressed image produced by the image compression function the resulting image can be used for more accurate association of related images with fewer false positives.

Therefore the size of the common representation needs to be sufficiently large to provide an effective false positive rate in the detection of spam images. In practice where the common representation is a bitmap having a predetermined size and colour palette, it has been found that effective detection of spam images is possible if the predetermined size is 400 pixels or more, preferably 576 pixels or more, and the predetermined number of colours is 5 or more. Images of size 400 or 576 pixels equates to images of size 20×20 pixels or 24×24 if square, although the common representation may be rectangular.

A weak compression function producing a large common representation provides an extremely large number of possible outcomes with a corresponding large number of possible sets of images. If too large, this may only serve to identify images which are very similar and therefore fail to detect many types of alteration of spam images. Therefore the size of the common representation needs to be sufficiently small to provide an effective detection rate in the detection of spam images. In practice where the common representation is a bitmap having a predetermined size and colour palette, it has been found that effective detection of spam images is possible if the predetermined size is 22500 or less, preferably 13684 pixels or less, and the predetermined number of colours is 24 or less. Images of size 22500 or 13684 pixels equates to an image of size 150×150 pixels or 128×128 pixels if square, although the common representation may be rectangular.

There will now be described a system for detecting spam images which implements the present invention. The system consists of a preprocessing subsystem 100 shown in FIG. 4 for preprocessing a corpus of known spam images to generate a reference database and an analysis subsystem 200 shown in FIG. 5 for analysing subject emails. The system may be applied at a node of a network and used to analyse emails (or other electronic objects) passing through that node en route from a sender to a recipient. The system may form part of a wider suite of filters for detecting spam using other techniques and for detecting malware.

In an environment where many emails are being analysed per second to detect if they contain spam, in practical terms it would take an undesirably long time for any image in an email to be compressed and then for each known spam image in a corpus to be compressed and compared pixel by pixel. Thus the process is speeded up in two ways.

Firstly the corpus of known spam images is compressed and the result stored in a preliminary process to create a reference database. Thus the compression of the known spam images in the corpus is done in advance of a subject email being analysed.

Secondly, the detection of whether compressed forms of images are identical is performed by calculating hash values of the compressed forms and determining whether the hash values are identical. Thus the reference database contains the stored set of hash values of the compressed forms of the known spam images in the corpus. The comparison of hash values is an extremely quick and easy process to perform.

The preprocessing subsystem 100 will now be described with reference to FIG. 4.

A corpus 110 of known spam emails that contain embedded images is collected. The emails are known to be spam for example by having been classified as such by users.

This corpus is passed to an image extraction engine 101 which extracts the image data from the emails within corpus 110. The image extraction engine 101 resolves the many different image types (e.g. jpeg, gif, png, bmp etc.) into a single common format. Thus the image extraction engine 101 produces a corpus of known spam images.

The known spam images extracted by the image extraction engine 101 are passed to the image compression unit 102. The image compression unit 102 compresses the known spam images using an image compression function which is lossy and effective to compress every image into a common representation, regardless of the size of the image without compression.

For simplicity of calculation, the common representation may be a bitmap having a predetermined size and a predetermined colour palette consisting of a predetermined number of colours. In this case, the image compression function has two effects.

Firstly, the image compression function reduces the size of the image from its original height and width to a common height and width common to all images. This may be achieved by a simple averaging function in which each pixel in the compressed form of the image is derived by a linear combination of pixels in a window of the original image at a corresponding location. All the pixels in the window may have an equal weighting in the linear combination or a window function may be used so that the weightings are not equal.

Secondly, the image compression function reduces the colour depth to apply a common colour palette. This may be achieved simply by selecting the closest match in the colour palette in respect of each pixel in the compressed form of the image. This ensures that the compressed form of the image only contains colours from the same common colour palette It will be appreciated that both the reduction in the size of the image and in the colour depth cause a reduction in the amount of information and are hence a form of lossy compression. In general a wide range of lossy compression functions may alternatively be performed. Although it is convenient for the common representation to be a bitmap, in general the common representation may be of some other type, for example vector graphics or a transform coefficients.

The compressed forms of each known spam image in the corpus is passed from the image compression unit 102 is passed to a hash function unit 103 which calculates a hash value 104 for known spam image using a hash function. Each hash value 104 is a binary signature which is effectively unique to the compressed form of the known spam image from which it is derived (or more strictly there is a very low, and in practical terms negligible, probability that two different compressed forms will have the same hash value 104). Any hash function may be applied. One possible hash function which may be used is MD5.

The hash values 104 calculated by the hash function unit 103 are stored in a database 105 for use as a reference in determining if emails under analysis are spam.

The analysis subsystem 200 will now be described with reference to FIG. 5.

The analysis subsystem 200 processes each incoming email 201 as follows. A decision unit 202 determines whether the incoming email 201 contains an image. If not the incoming email is passed on, as shown by step 203 in FIG. 5, without being processed by the remainder of the analysis subsystem 200.

An incoming email 201 which does contain an embedded image is passed to an image extraction engine 204, an image compression unit 205 and a hash function unit 206 which are identical, respectively, to the image extraction engine 101, the image compression unit 102 and the hash function unit 103 of the preprocessing subsystem 100 and act as previously described. Thus the image extraction engine 204 extracts an image embedded in the email 201, the image compression unit 205 compresses the image and the hash function unit 206 calculates a hash value 207 of the compressed form of the image extracted from email 201. It is noted in particular that the image compression units 102 and 205 apply the same image compression function to compress the image and produce the compressed form of the image in a common representation, as described above. Similarly, the hash function units 206 and 103 apply the same hash function.

The hash value 207 of the compressed form of the image extracted from email 201 output by the hash function unit 206 is supplied to a decision unit 208. The decision unit 208 queries the database 105 previously prepared by the preprocessing subsystem 100 for the presence of the hash value 207. Thus the decision unit 208 determines if the hash value 207 derived from the image under analysis is identical to any one of set of the hash values 104 stored in the database 105 being the hash values 104 of any of the known spam images in the corpus 110.

This has the effect (subject only to the accuracy of the hash function) of determining the compressed form of the image embedded in the email 201 is identical to the compressed form of any of the known spam images in the corpus 110. On the basis of this determination, if the image embedded in the email 201 is identical to the compressed form of any of the known span image in the corpus, then the decision unit 208 produces an output 209 signalling that the email 201 embeds a spam image. Otherwise the decision unit 208 produces an output 210 signalling that the email 201 does not embed a spam image.

In the event of the output 209 signalling that the email 201 embeds a spam image, the email may optionally be subject to some form of remedial action in a remedial action unit 211. The form of the remedial action may take a variety of forms, for example and without limitation including any of following action: drawing the attention of the spam email to an expert user to allow review of the finding; deleting the email 201; routing the email 201 to a spam folder accessible by the recipient; modifying the email 201 to identify it to the recipient as likely spam; storing the email 201 in a server and sending the recipient a notification; and/or performing further analysis.

A modified version of the system will now be described with reference to FIGS. 6 and 7.

The reason for the modification to the system will first be explained. Notwithstanding the effectiveness of the system shown in FIGS. 4 and 5 in detecting spam images, it is nevertheless accompanied by a certain number of false positives when by chance it happens that a ham image has a compressed form which is identical to the compressed form of a spam image even if from a source unrelated to a spam image. The modification, which is optional, is intended to reduce the number of such false positives as follows.

The modification is based on the principle that images which in their uncompressed form are of widely differing sizes are unlikely to be altered versions of the same spam image. Whilst spammers are adept at frequently changing the size of spam images to reduce the chances of detection it is rare for a widely differing size to be used as this will generally require fundamental change to the nature of the content of the spam image. Typically the changes in size introduced by the spammers are of the order of 20% or less. Therefore the modification involves additionally comparing the size of the image extracted from the email 201 under analysis and without compression with the size of the known spam images without compression and making a decision that the extracted image is spam only if the sizes are similar to some predetermined degree.

Figure 6:
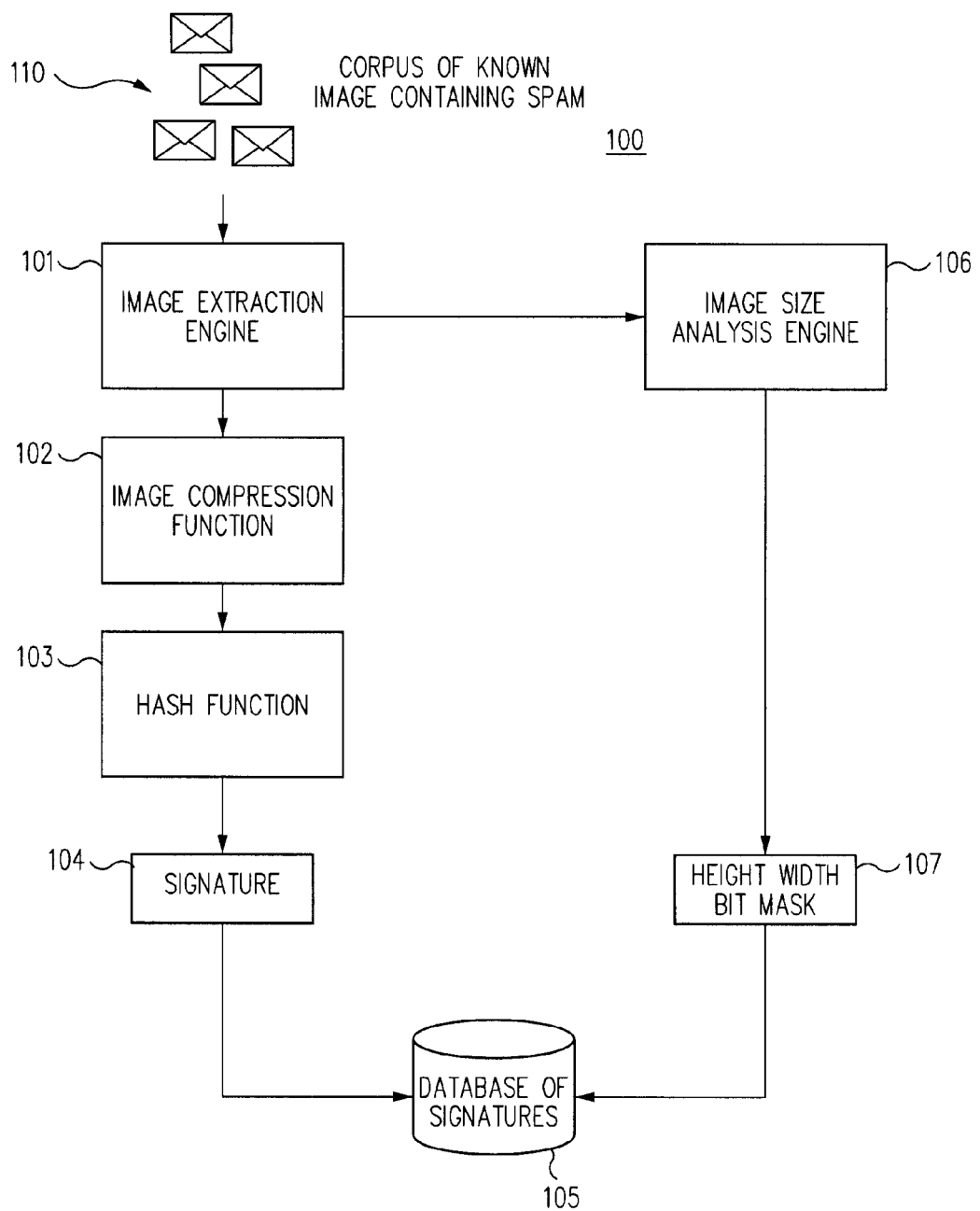
FIG. 6 is a diagram of a modified subsystem for preliminarily processing a corpus of known spam images.

The preprocessing subsystem 100 is modified as shown in FIG. 6 to include an image size analysis engine 106 which is supplied with the known spam images extracted from the emails in the corpus 110. The image size analysis engine 106 derives a bit mask 107 expressing the size of the image (without compression). In particular, the bit mask 107 is derived using a bit mask function which sets respective bits of the bit mask 107 when the size of the image lies in a respective range. Thus each bit corresponds to a predetermined range of sizes. The ranges of size overlap, as described further below.

In this example, the bit mask 107 has two parts, one part being bits representing the height of the image and the other part being bits representing the width of the image, but alternatively it would be possible to set bits for the size of the image as a whole.

The image size analysis engine 106 stores the derived bit mask 107 in the database 104 in association with the corresponding hash value 104 derived from the same known spam image in the corpus 110.

Figure 7:
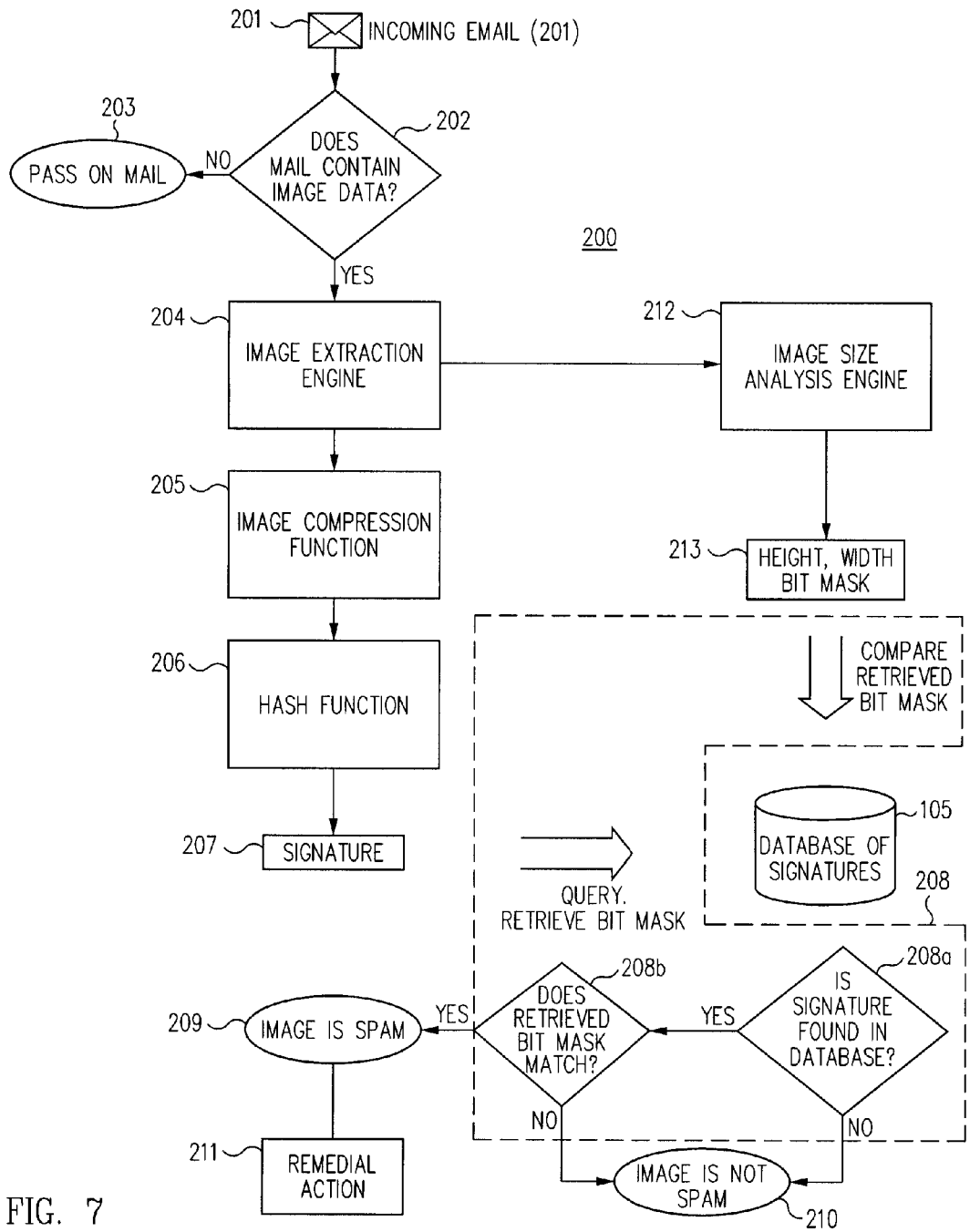
FIG. 7 is a diagram of a modified subsystem for analysing subject emails.

Similarly, the analysis subsystem 200 is modified as shown in FIG. 7 to include an image size analysis engine 212 which is supplied with the images extracted by the image extraction engine 204. The image size analysis engine 212 is identical to the image size analysis engine 106 of the preprocessing subsystem 100 and act as previously described. Thus the image size analysis engine 212 derives a bit mask 213 representing the size of the image extracted from the email 201 under analysis. The image size analysis engines 106 and 212 both use a common bit map function and so the bits of the bit mask 213 are set when the size of the image extracted from the email 201 falls within the same, respective ranges.

A further modification of the analysis subsystem 200 is to the nature of the determination made by the decision unit 208. The decision unit 208 still determines if the hash value 207 derived from the image under analysis is identical to any one of set of the hash values 104 stored in the database 105 in order to determine if the compressed form of the image embedded in the email 201 is identical to the compressed form of any of the known spam images in the corpus 110, as shown by operation 208a in FIG. 7.

In addition, in the event that it is found in operation 208a that the compressed form of the image embedded in the email 201 is identical to the compressed form of one of the known spam images, the decision unit 208 proceeds with operation 208b which compares the bit mask 213 derived from the image embedded in the email 201 with the bit mask 107 for the same one of the known spam images. In particular it is determined whether these two bit masks 107 and 213 have any bit set in common, in respect of both height and width. This may achieved simply by applying a binary AND operation to the two bit masks 107 and 213, and determining if any bit of the result is set.

As the respective bits in the bit masks 107 and 213 are set when the size of the image in question is in a particular range, the operation 208b has the effect of rapidly comparing the size of the compressed form of the image embedded in the email 201 with the compressed form of the one of the known spam images to which it is identical. If the two bit masks 107 and 213 have a common bit set in respect of height and a common bit set in respect of width, then the operation 208b determines the images are similar in size, or otherwise that the images are dissimilar in size.

The overlapping of the ranges corresponding to each bit is used to deal with boundary issues. If the ranges did not overlap, a small change in image size near the boundary can moves the image size from one image range to another, resulting in a different bit being set in the bit mask 213 and the image size comparison erroneously reporting that two images are not similar in size. The overlapping of the ranges accounts for this. An image may have more than one bit set in the bit masks 107 and 213. This results in the comparison of two bit masks 107 and 213 representing image size more likely to give a true result denoting that the images are similar is size. Therefore the operation 208b has the effect of determining that the image sizes are similar to a predetermined degree controlled by the size of the ranges and overlap.

As to the actual ranges used, the following considerations apply. The same change in the number of pixels of height or width will be much more significant for small images than for large images. A change of 50 pixels in one dimension in respect of a 50×50 pixel image may result in a doubling of the image size, or result in the image becoming invisible to the viewer. Conversely, a change of 50 pixels in one dimension in respect of a 900×900 pixel image may be barely noticeable. To account for degree of these changes, the image comparison function must be able to recognise that small changes in image size may or may not result in large perceived changes for the viewer. To account for this the size range increments between bits in the bit mask are not linear but based on a modified Fibonacci sequence. By way of example, the following table shows one possible set of ranges for each bit of the bit mask, the same table being applied for the bits corresponding to height and the bits corresponding to width:

| Bit position | Size range (no. of pixels) |
| --- | --- |
| 1 | 0-253 |
| 2 | 227-323 |
| 3 | 288-411 |
| 4 | 367-524 |
| 5 | 468-668 |
| 6 | 596-851 |
| 7 | 760-1083 |
| 8 | >1083 |

In the modified analysis subsystem 200, decision unit 208 produces an output 209 signalling that the email 201 embeds a spam image on the basis of a determination in operation 208a that the compressed form of the image embedded in the email 201 is identical to the compressed form of one of the known spam images in the corpus 110 in combination with a determination in operation 208b that the size of the image embedded in the email 201 without compression is similar to the size of the same one of the known spam images. Otherwise the decision unit 208 produces an output 210 signalling that the email 201 does not embed a spam image.

A worked example of the use of compression and hash values in the system described above will now be given with reference to some actual spam images shown in FIGS. 8 to 14. For each spam image, the size and the MD5 hash value of the image without compression are as follows:

FIG. 8 shows stock1.gif
   dimensions: 559×688 pixels
   size: 26.5 Kb
   MD5 hash value: 85e1bbe17abc694b2d7de709837a74c2
FIG. 9 shows stock2.gif
   dimensions: 509×674 px
   size: 26.6 Kb
   MD5 hash value: 9ae34635a9ab2f2927825f11dd4c5 db6
FIG. 10 shows stock3.gif
   dimensions: 624×706 px
   size: 33.3 Kb
   MD5 hash value: 12a909bacb4752629c3dc5387d0975b6
FIG. 11 shows soft1.gif
   dimensions: 229×91 px
   size: 8.23 Kb
   MD5 hash value: 324d588a9c74088f09f7651f5349b755
FIG. 12 shows soft2.gif
   dimensions: 229×91 px
   size: 12.2 Kb
   MD5 hash value: 1fe64198d03de9ada5cb38c986624228
FIG. 13 shows drug1.gif
   dimensions: 310×175 px
   size: 3.20 Kb
   MD5 hash value: b5d5cdc88e08d7ef82b8f638cel6188e
FIG. 14 shows drug2.gif
   dimensions: 305×178 px
   size: 3.21 Kb
   MD5 hash value: 2cf83b0850f5df46c962940a31e133ea It will be apparent from a consideration of the actual images that stock1.gif, stock2.gif, and stock3.gif are all altered versions of a first spam image; soft1.gif and soft2.gif are both altered versions of a second spam image; and drug1.gif and drug2.gif are both altered versions of a third spam image.

Figure 4:
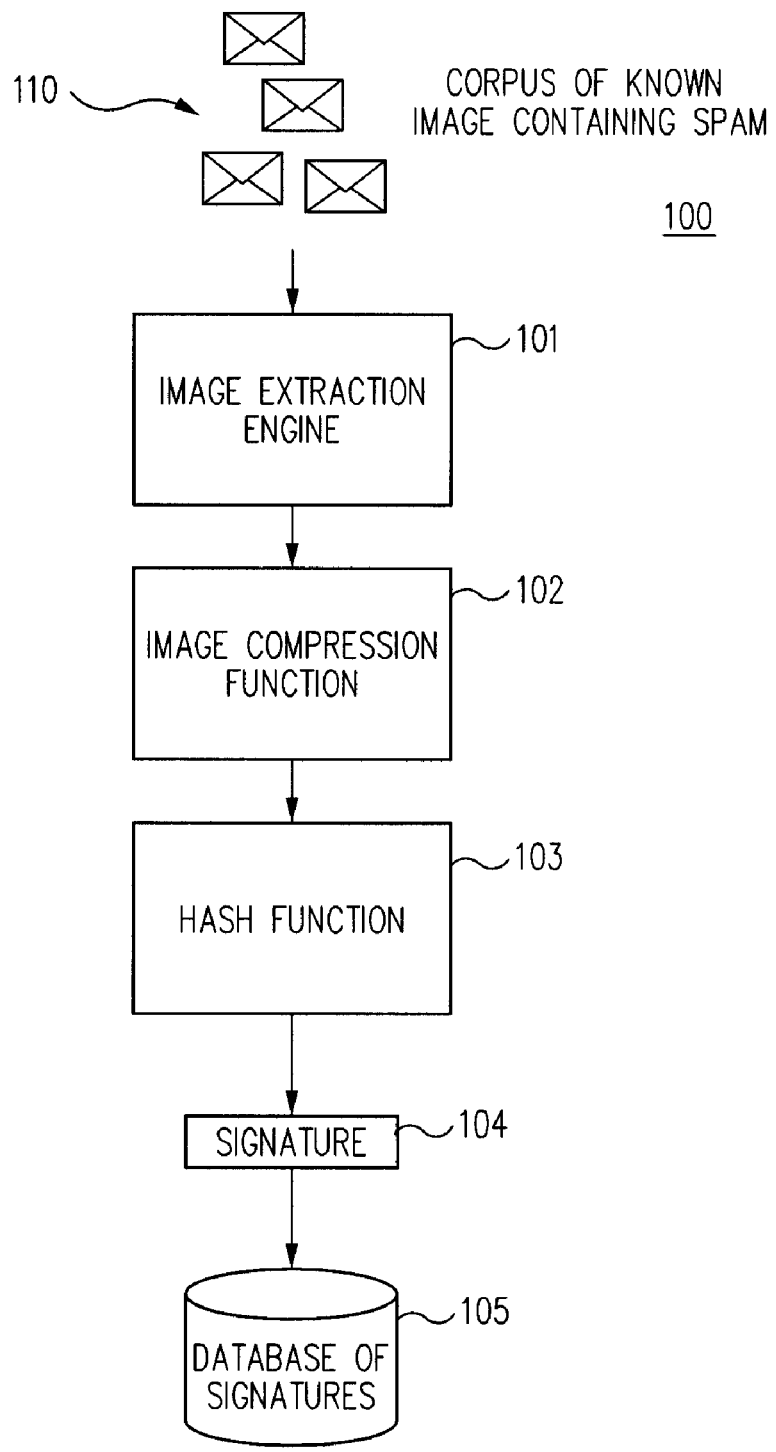
FIG. 4 is a diagram of a subsystem for preliminarily processing a corpus of known spam images.
Figure 5:
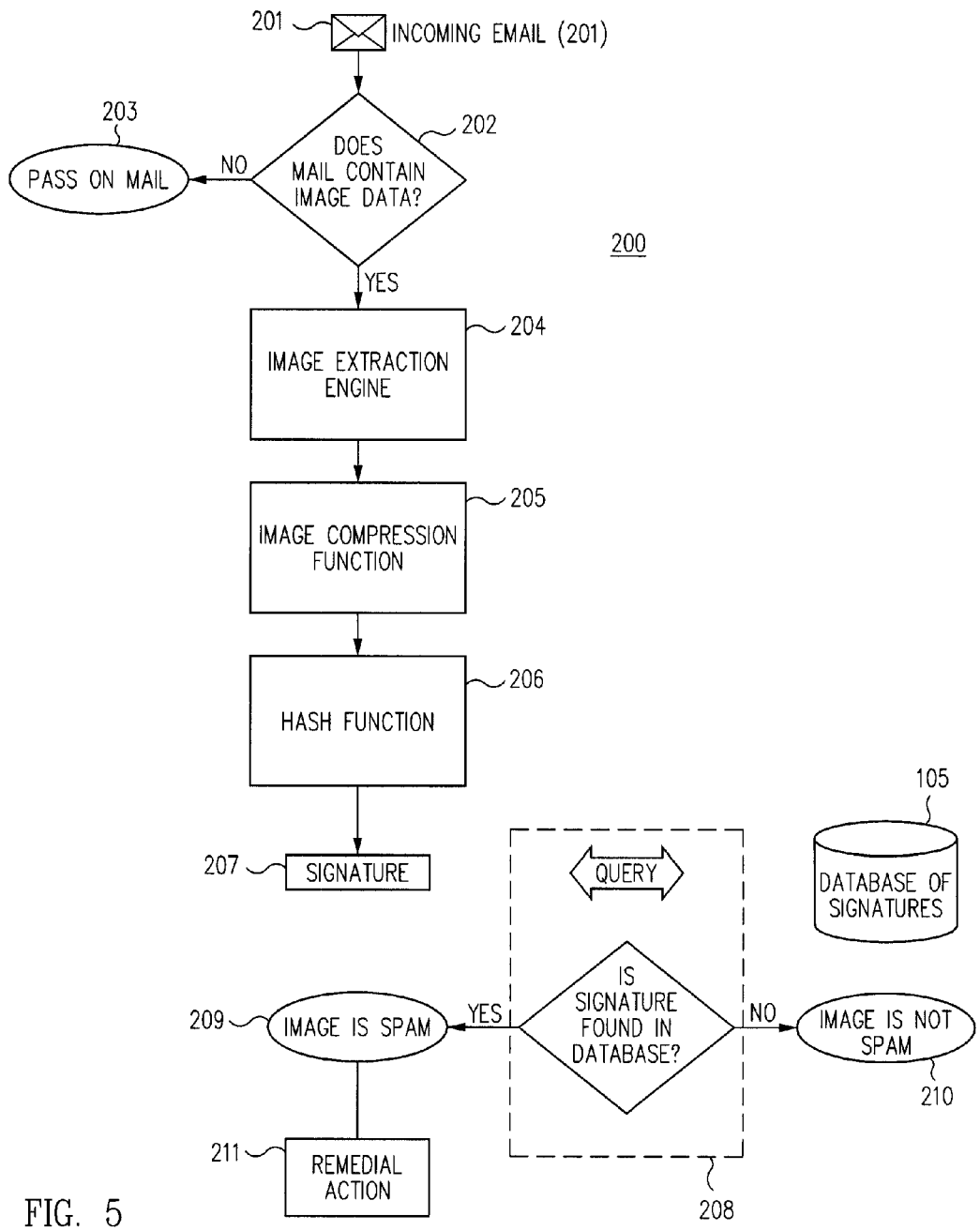
FIG. 5 is a diagram of a subsystem for analysing subject emails.

Firstly the system shown in FIGS. 4 and 5 without modification is considered. Using the image compression unit 205 (or 102) to compress the images to a common representation consisting of an 8×8 pixel representation containing 8 colours (white, black, red, green, blue, yellow, cyan, magenta) and using the hash function unit 206 (or 103) to apply the MD5 hash function gives the following hash values 207 (or 104) for the compressed images:

| Image name | hash value 207 (or 104) |
|---|---|
| stock1.gif | 51e23ea79f37a3e70b1b96a316a0f2ab |
| stock2.gif | 51e23ea79f37a3e70b1b96a316a0f2ab |
| stock3.gif | 51e23ea79f37a3e70b1b96a316a0f2ab |
| soft1.gif | 3d1f1dc3475c1480b809adbc0efe17af |
| soft2.gif | 3d1f1dc3475c1480b809adbc0efe17af |
| drug1.gif | 51e23ea79f37a3e70b1b96a316a0f2ab |
| drug2.gif | 51e23ea79f37a3e70b1b96a316a0f2ab |

Examination of the hash values 207 shows that the images, stock1.gif, stock2.gif, stock3.gif, drug1.gif and drug2.gif are detected as being similar to each other; and the images soft1.gif and soft2.gif are detected as being related to each other but different to the other images.

Therefore if stock1.gif and soft1.gif are known spam images in the corpus 110, then the analysis subsystem 200 correctly detects stock2.gif, stock3.gif and soft2.gif as spam, but incorrectly detects drug2.gif as being related to stock1.gif.

This illustrates the basic operation of the system and also the possibility of a false negative. Such a false negative can be avoided by the modified system shown in FIGS. 6 and 7. In this case, the image size analysis engine 212 (or 106) produces the following bit masks 213 (or 107) for each image:

| Image name | Bit Mask 213 (or 107) for height | Bit Mask 213 (or 107) for width |
|---|---|---|
| stock1.gif | 00001000 | 00000100 |
| stock2.gif | 00011000 | 00000100 |
| stock3.gif | 00001100 | 00000100 |
| soft1.gif | 11000000 | 10000000 |
| soft2.gif | 11000000 | 10000000 |
| drug1.gif | 01100000 | 10000000 |
| drug2.gif | 01100000 | 10000000 |

Thus, stock1.gif, stock2.gif, and stock3.gif all share a common set bit in the bit mask 213 (or 107) in respect of both height and width; and drug1.gif and drug2.gif share a common set bit in the bit mask 213 (or 107) in respect of both height and width, but importantly do not share common set bit in the bit mask 213 (or 107) with stock1.gif, stock2.gif, and stock3.gif. This information is used in operation 208b of the decision unit 208 to infer that, on one hand, stock1.gif, stock2.gif, and stock3.gif and, on the other hand, drug1.gif and drug2.gif are not related to each other, thereby avoiding the false positive mentioned above.

Another approach is to reduce the strength of the compression function so that the common representation is bigger to provide a more stringent image comparison. If the common representation is a 64×64 pixel representation with the same 8 colours as before, the following hash values 207 (or 104) for the compressed images are derived:

| Image name | MD5 hash value |
|---|---|
| stock1.gif | 550220a7c9bcd9e4aaae372e04c78daa |
| stock2.gif | 550220a7c9bcd9e4aaae372e04c78daa |
| stock3.gif | 550220a7c9bcd9e4aaae372e04c78daa |
| soft1.gif | be03562d2d148fa75c1a51c0bb341ada |
| soft2.gif | 5b9429b181e70cb15b02daebc0fae4f9 |
| drug1.gif | 8bc612d6d0972b32cdc3b70a7dfc6840 |
| drug2.gif | cacc97c7f347c47ef8c7ae1227d8aea7 |

In this case, stock1.gif, stock2.gif, stock3.gif are detected as being similar, whereas none of the other images are detected as being similar. Therefore the false positive mentioned above is avoided but at the expense of reducing the detection rate.

The invention claimed is:

1. A method of detecting spam images in electronic mail, the method comprising:
   obtaining one or more known spam e-mails;
   obtaining and extracting known spam images from the known spam e-mails;
   compressing the extracted known spam images into a common representation having a common size and color palette using a lossy compression function;
   using the compressed known spam images to create a corpus of compressed known spam images;
   extracting images embedded in a subject electronic mail message;
   compressing the extracted images embedded in the subject electronic mail message into a common representation having the common size and color palette using a lossy compression function;
   determining if the compressed forms of the extracted images embedded in the subject electronic mail message are identical to the compressed form of any of the extracted known spam images in the corpus of known spam images; and
   signaling the subject electronic mail message as embedding a spam image on the basis of a compressed form of an extracted image extracted from the subject electronic mail message being determined to be identical to the compressed form of a known spam image.

2. A method according to, claim 1 wherein the common size is 22500 pixels or less.

3. A method according to claim 1, wherein the common size is 13684 pixels or less.

4. A method according to claim 1, wherein the number of colours included in the common color palette is 24 or less.

5. A method according to claim 1, wherein the common size is 400 pixels or more.

6. A method according to claim 1, wherein the common size is 576 pixels or more.

7. A method according to claim 1, wherein the number of colours included in the common color palette is 5 or more.

8. A method according to claim 1, wherein
   determining if the compressed forms of the extracted images embedded in the subject electronic mail message are identical to the compressed form of any of the extracted known spam images in the corpus of known spam images comprises:
   calculating the hash values of the compressed forms of the extracted images embedded in the subject electronic mail message; and
   determining if the hash values of the compressed forms of the extracted images embedded in the subject electronic mail message are the same as the compressed form of any of the extracted known spam images in the corpus of known spam images.

9. A method according to claim 8, further comprising a preliminary process of calculating the hash values of the compressed forms of the extracted known spam images, and storing the hash values of the compressed forms of the extracted known spam images to constitute a stored set of hash values.

10. A method according to claim 1, wherein the method further comprises:

determining, in respect of the the compressed forms of the extracted images embedded in the subject electronic mail message which are determined to be identical to the compressed form of one of the known spam images in said corpus, if the size of the respective extracted images without compression is similar to a predetermined degree to the size of the corresponding one of the extracted known spam images without compression; and said step of signaling the subject electronic mail message as embedding a spam image is performed on the basis of a compressed form of the extracted image embedded in the subject electronic mail message being determined to be identical to the compressed form of a extracted known spam image in combination with the size of the respective extracted image embedded in the subject electronic mail message without compression being determined to be similar to a predetermined degree to the size of the one of the extracted known spam images without compression.

11. A method according to claim 10, determining, in respect of the compressed forms of the extracted images embedded in the subject electronic mail message which are determined to be identical to the compressed form of one of the known spam images in said corpus, if the size of the respective extracted images without compression is similar to a predetermined degree to the size of the corresponding one of the extracted known spam images without compression comprises:

deriving a bit mask expressing the size of the respective extracted images embedded in the subject electronic mail message without compression using a bit mask function which sets respective bits of the bit mask when the size lies in respective ranges, which ranges overlap; and determining if the derived bit mask has any bit set in common with a stored set of bit masks expressing the size of the extracted known spam images in said corpus without compression and derived using the same bitmap function.

12. A method according to claim 1, wherein the method further comprises, in response to said signaling the subject electronic mail message as embedding a spam image, performing a remedial action in respect of the subject electronic mail message.

13. A method according to claim 1, wherein the method is performed on a subject electronic mail message passed through a node on a network.

14. A method according to claim 1, wherein said lossy compression function is an averaging function which reduces the number of bits of the image to which it is applied.

15. A system for detecting spam images in electronic mail messages, the system comprising:

means for obtaining one or more known spam e-mails;

an image extraction engine operative to extract known spam images from the known spam e-mails;

a compression unit operative to compress the known spam images into a common representation having a common size and color palette using a lossy compression function;

an image extraction engine operative to extract images embedded in the electronic mail messages;

a compression unit operative to compress the extracted images embedded in the electronic mail message into a common representation having a common size and color palette using a lossy compression function;

a determination unit operative to determine if the compressed forms of the extracted images embedded in the electronic mail message are identical to the compressed form of any known spam image; and a signal unit operative to signal electronic mail messages as embedding a spam image responsive to the determination unit determining that a compressed form of an extracted image embedded in an electronic mail message is identical to the compressed form of a known spam image.

16. A system according to claim 15, wherein the common representation is a bitmap.

17. A system according to claim 16, wherein the common size is 22500 pixels or less.

18. A system according to claim 16, wherein the common size is 13684 pixels or less.

19. A system according to claim 16, wherein the number of colours included in the common color palette is 24 or less.

20. A system according to claim 16, wherein the common size is 400 pixels or more.

21. A system according to claim 16, wherein the common size is 576 pixels or more.

22. A system according to claim 16, wherein the number of colours included in the common color palette is 5 or more.

23. A system according to claim 15, wherein said determination unit is operative to determine if the compressed forms of the extracted images embedded in the electronic mail message are identical to the compressed form of any known spam image by being operative:

to calculate the hash values of the compressed, extracted images embedded in the electronic mail message; and to determine if the hash values of the compressed, extracted images embedded in the electronic mail message are the same as any one of a stored set of hash values of the compressed forms of the known spam images.

24. A system according to claim 23, further comprising a reference database generator comprising:

a hash unit operative to calculate the hash values of the compressed forms of the known spam images, and to store the hash values of the compressed forms of the known spam images to constitute a stored set of hash values.

25. A system according to claim 15, wherein the system further comprises:

a second determination unit operative, in respect of the compressed forms of the extracted images embedded in the electronic mail message which the first mentioned determination unit determines to be identical to the compressed form of one of the known spam images, to determine if the size of the respective extracted images embedded in the electronic mail message without compression is similar to a predetermined degree to the size of the corresponding one of the known spam images without compression; and said signaling unit is operative to signal electronic mail messages as embedding a spam image responsive to the first determination unit determining that a compressed form of an extracted image extracted from an electronic mail message is identical to the compressed form of a known spam image in combination with the second determination unit determining that the size of the respective extracted image embedded in the electronic mail message without compression is similar to the predetermined degree to the size of the one of the known spam images without compression.

26. A system according to claim 25, wherein said second determination unit is operative to determine if the size of the respective extracted images embedded in the electronic mail message without compression is similar to a predetermined degree to the size of the corresponding one of the known spam images without compression by being operative:

to derive a bit mask expressing the size of the respective extracted images embedded in the electronic mail message without compression using a bit mask function which sets respective bits of the bit mask when the size lies in respective ranges, which ranges overlap; and to determine if the derived bit mask has any bit set in common with a stored set of bit masks expressing the size of the known spam images without compression and derived using the same bitmap function.

27. A system according to claim 15, further comprising a unit operative, in response to said signaling of electronic mail messages as embedding a spam image, to perform a remedial action in respect of those electronic objects.

28. A system according to claim 15, wherein the system is provided at a node of a network and is operative on electronic mail messages passing through the node.

29. A system according to claim 15, wherein said lossy compression function is an averaging function which reduces the number of bits of the image to which it is applied.

* * * * *